United States Patent
Raghavan (10) Patent No.: US 8,040,175 B2
(45) Date of Patent: Oct. 18, 2011

(54) SUPPLY REGULATED CHARGE PUMP SYSTEM

(75) Inventor: Vijay Raghavan, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 12/258,276

(22) Filed: Oct. 24, 2008

(65) Prior Publication Data

US 2009/0167418 A1 Jul. 2, 2009

Related U.S. Application Data

(60) Provisional application No. 61/000,198, filed on Oct. 24, 2007.

(51) Int. Cl.
*G05F 1/10* (2006.01)
(52) U.S. Cl. .......................... 327/536; 363/60
(58) Field of Classification Search .................. 327/536; 363/59–60
See application file for complete search history.

(56) References Cited

U.S. PATENT DOCUMENTS

| | | | |
|---|---|---|---|
| 5,140,182 A | 8/1992 | Ichimura | |
| 5,499,183 A | 3/1996 | Kobatake | |
| 5,574,634 A | 11/1996 | Parlour et al. | |
| 5,675,279 A * | 10/1997 | Fujimoto et al. | 327/536 |
| 5,801,934 A * | 9/1998 | Lacey et al. | 363/60 |
| 5,808,505 A * | 9/1998 | Tsukada | 327/536 |
| 5,982,223 A | 11/1999 | Park et al. | |
| 6,002,599 A * | 12/1999 | Chow | 363/59 |
| 6,018,264 A | 1/2000 | Jin | |
| 6,137,343 A * | 10/2000 | Matano | 327/535 |
| 6,175,264 B1 | 1/2001 | Jinbo | |
| 6,278,315 B1 * | 8/2001 | Kim | 327/536 |
| 6,292,048 B1 | 9/2001 | Li | |
| 6,373,323 B2 | 4/2002 | Kuroda | |
| 6,373,324 B2 | 4/2002 | Li et al. | |
| 6,400,211 B1 * | 6/2002 | Yokomizo et al. | 327/536 |
| 6,459,328 B1 | 10/2002 | Sato | |
| 6,473,321 B2 | 10/2002 | Kishimoto et al. | |
| 6,486,729 B2 | 11/2002 | Imamiya | |
| 6,545,529 B2 | 4/2003 | Kim | |
| 6,556,067 B2 * | 4/2003 | Henry | 327/536 |
| 6,577,514 B2 * | 6/2003 | Shor et al. | 363/59 |
| 6,600,299 B2 * | 7/2003 | Xi | 323/280 |
| 6,605,984 B2 | 8/2003 | Annavajjhala et al. | |
| 6,734,718 B1 | 5/2004 | Pan | |
| 6,803,807 B2 * | 10/2004 | Doi et al. | 327/536 |
| 6,836,176 B2 | 12/2004 | Zeng et al. | |
| 6,859,091 B1 * | 2/2005 | Nicholson et al. | 327/536 |
| 7,030,682 B2 | 4/2006 | Tobita | |
| 7,116,155 B2 | 10/2006 | Pan | |
| 7,116,156 B2 | 10/2006 | Myono et al. | |

(Continued)

OTHER PUBLICATIONS

Louie Pylarinos, "Charge Pumps: An Overview," Edward S. Rogers Sr. Department of Electrical and Computer Engineering, University of Toronto, 7 pages.

(Continued)

*Primary Examiner* — Thomas J Hiltunen (57) ABSTRACT

An apparatus and a method for maintaining an output voltage of a charge pump circuit near a target voltage is disclosed. A regulated supply voltage is generated based on the output voltage of the charge pump. The regulated supply voltage is applied to a voltage input to the charge pump circuit and to a voltage input of a clock driver that provides a regulated clock signal to the charge pump circuit.

16 Claims, 5 Drawing Sheets

U.S. PATENT DOCUMENTS

| | | | |
|---|---|---|---|
| 7,173,477 B1 | 2/2007 | Raghavan | |
| 7,227,403 B2 | 6/2007 | Kim | |
| 7,271,642 B2* | 9/2007 | Chen et al. | 327/514 |
| 7,276,960 B2 | 10/2007 | Peschke | |
| 7,504,876 B1* | 3/2009 | Raghavan et al. | 327/536 |
| 7,545,685 B2* | 6/2009 | Lee | 365/189.11 |
| 7,589,583 B2* | 9/2009 | Yoshikawa et al. | 327/536 |
| 7,795,951 B2* | 9/2010 | Choy | 327/536 |
| 7,843,255 B2* | 11/2010 | Poles et al. | 327/540 |
| 2005/0057300 A1* | 3/2005 | Ishii | 327/536 |
| 2006/0273843 A1* | 12/2006 | Daga et al. | 327/536 |
| 2008/0116958 A1* | 5/2008 | Ko et al. | 327/536 |
| 2009/0140795 A1* | 6/2009 | Choy | 327/536 |

OTHER PUBLICATIONS

USPTO Final Rejection for U.S. Appl. No. 10/978,045 dated Aug. 3, 2006; 7 pages.
USPTO Non-Final Rejection for U.S. Appl. No. 10/978,045 dated Apr. 5, 2006; 7 pages.
USPTO Notice of Allowance for U.S. Appl. No. 11/478,006 dated Oct. 31, 2008; 4 pages.
USPTO Non-Final Rejection for U.S. Appl. No. 11/478,006 dated Nov. 21, 2007; 4 pages.
USPTO Notice of Allowance for U.S. Appl. No. 10/978,045 dated Oct. 19, 2006; 6 pages.

* cited by examiner

SUPPLY REGULATED CHARGE PUMP SYSTEM

CROSS-REFERENCE TO RELATED APPLICATIONS

This application claims the benefit of U.S. Provisional Patent Application No. 61/000,198, filed Oct. 24, 2007.

TECHNICAL FIELD

This disclosure relates to the field of charge pumps, and more particularly, to the control of an output voltage of a charge pump.

BACKGROUND

High voltages are commonly used in certain integrated circuit applications, such as non-volatile memory. Typically, lower voltages that are more readily available are boosted to produce the higher voltage levels used by such applications. In the specific case of non-volatile memory, the high voltages are used to program or erase memory cells. For example, a high positive voltage can be used to program a non-volatile memory cell, while a high negative voltage can be used to erase a memory cell.

A charge pump is one type of circuit that can be used to generate these high positive and negative voltages. Although many types of charge pumps exist, most charge pumps generally operate in similar fashion. A typical charge pump receives an input from a voltage source, then boosts the input voltage to produce a higher output voltage.

The boosted output voltage of a charge pump is not perfectly stable, but may be characterized by variation in the voltage level called a ripple voltage. Excessive ripple in the output voltage can cause problems in applications for which the output voltage is used. For example, a non-volatile memory may specify a minimum voltage level to reliably program a cell. If excess ripple causes the voltage level to drop below this minimum voltage level, the reliability of a programming operation using the output voltage can be degraded.

In addition, ripple in the output voltage can also inject noise to the rest of the circuit. The output voltage may ripple at a particular frequency, thus generating noise at that frequency. In some cases, the ripple frequency is not constant, such that noise resulting from the ripple voltage is more difficult to filter.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Ripple in the output voltage of a charge pump can be reduced by using filter capacitors. Such filter capacitors can occupy a large area of an integrated circuit substrate. For some applications where the charge pump output is used to drive a small load, the filter capacitors are used to control the output ripple may be even larger, occupying even more area on an integrated circuit substrate.

Described herein are embodiments of a method and apparatus for generating a low-ripple boosted output voltage and for maintaining the output voltage near a target voltage. According to one embodiment, a charge pump circuit, a clock driver, and a voltage regulator can be used to generate the low-ripple boosted output voltage. The voltage regulator generates a regulated supply voltage based on feedback from the output voltage of the charge pump circuit. The regulated supply voltage is supplied to the clock driver and determines the amplitude of a regulated clock signal generated by the clock driver. The regulated clock signal and the regulated supply voltage are applied to inputs of the charge pump circuit. The charge pump generates an output voltage, where the voltage level of the output voltage increases or decreases according to the amplitude of the regulated clock signal and the voltage level of the regulated supply voltage.

The output voltage generated by this charge pump system may be characterized by a low ripple voltage, for example, on the order of approximately 30 mV. Furthermore, because of the low ripple voltage, the use of large filter capacitors can be avoided. This allows the charge pump system to occupy a smaller area on an integrated circuit substrate.

Another characteristic of this charge pump system is that the output voltage ripple frequency depends upon the frequency of the regulated clock signal. Since this frequency is predictable, noise coupling effects from the output ripple voltage can be filtered according this known frequency.

Figure 1:
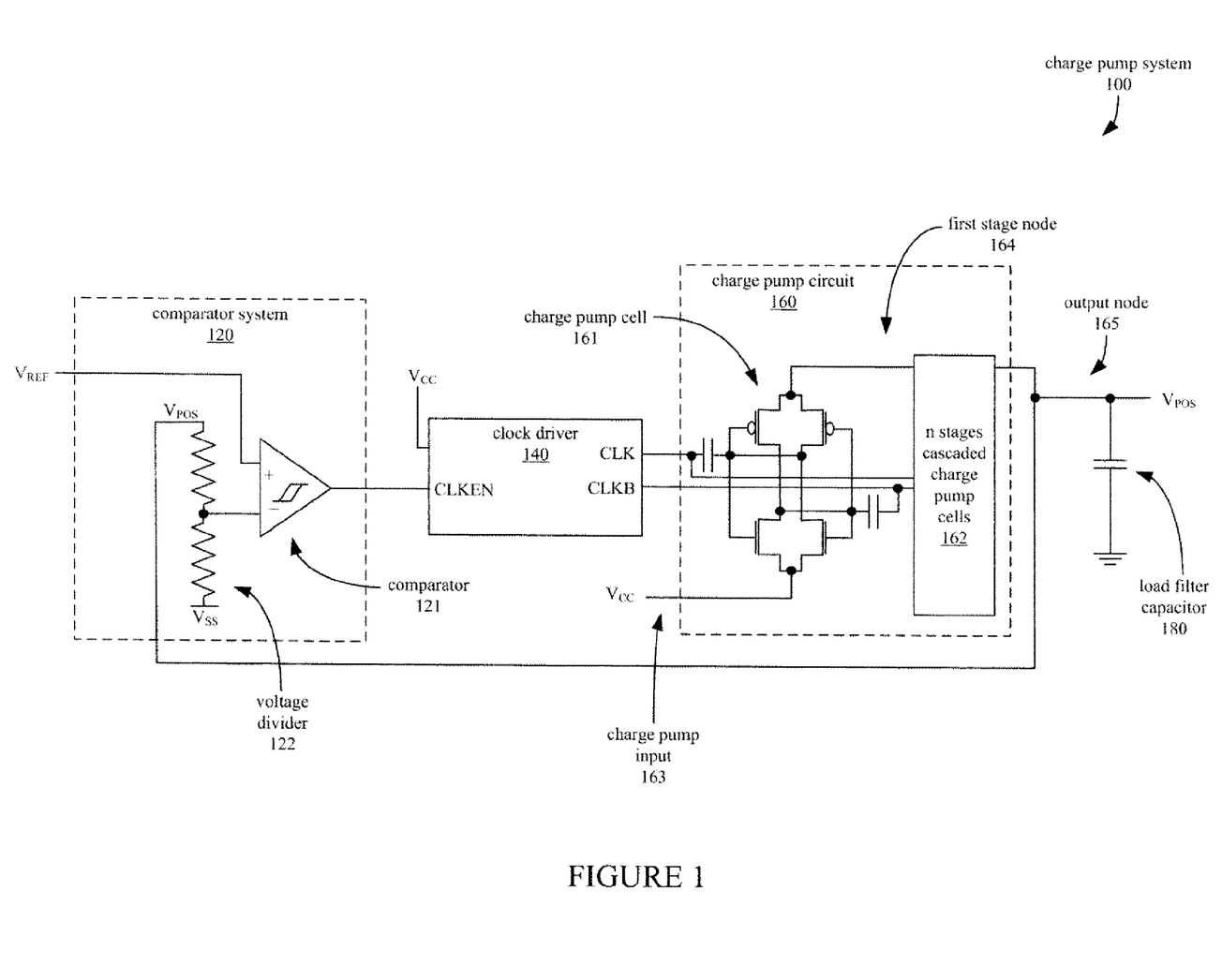
FIG. 1 illustrates one embodiment of a charge pump circuit with an output voltage controlled by a comparator system.

FIG. 1 illustrates one embodiment of a charge pump system including a charge pump circuit controlled by a comparator system. Charge pump system 100 operates to boost an input voltage $V_{CC}$ to a higher output voltage $V_{POS}$. Charge pump system 100 includes comparator system 120, clock driver 140, and charge pump circuit 160. Comparator system 120 further includes comparator 121 and voltage divider 122. Charge pump circuit 160 further includes charge pump cell 161, cascaded charge pump cells 162, charge pump input 163, and first stage node 164. Charge pump circuit 160 is connected to output node 165, which is further connected to ground through a load filter capacitor 180.

In one embodiment, the charge pump circuit 160 includes a number of charge pump cells 161 and 162. Each of the charge pump cells 161 and 162 receives an input voltage and boosts the input voltage to a higher output voltage. The charge pump cells 161 and 162 in the charge pump circuit 160 are cascaded in stages, so that an output voltage of one charge pump cell becomes an input voltage of the next charge pump cell. Thus each stage generates a boosted voltage from the previous stage. The charge pump cell in the final stage generates the final boosted output voltage.

For example, charge pump cell 161 boosts voltage VCC, which is supplied to the charge pump input 163. Charge pump cell 161 outputs the boosted voltage to the first stage node 164. The second stage boosts the first stage boosted voltage from node 164 and outputs a second stage boosted voltage to the third stage. The input voltage is thus successively boosted through the charge pump cell 161 of the first stage, and through the subsequent n stages of charge pump cells 162.

Operation of the charge pump circuit 160 is controlled by a clock driver 140. Clock driver 140 supplies a clock signal CLK and an inverted clock signal CLKB to the charge pump circuit 160. The clock signals CLK and CLKB control switches, which may be implemented by transistors or diodes, in charge pump circuit 160. The operation of these switches causes the charge pump circuit to boost the voltage at its input 163. For example, each on-off cycle of the switches boosts the input voltage by a small amount. Over several on-off cycles, the boosted output may reach a target voltage. When the clock signals are turned off, the switching stops and the charge pump circuit ceases operation. The voltage $V_{POS}$ at the output node 165 then decreases at a rate depending on a load current being drawn from the output node 165.

Thus, the voltage level of the output node 165 can be maintained near a target voltage by enabling and disabling the CLK and CLKB outputs of the clock driver 140. The comparator system 120 controls this enabling and disabling of the clock driver 140 based on the output voltage $V_{POS}$. In one embodiment, the comparator system 120 divides the output voltage $V_{POS}$ using a voltage divider 122, then compares the divided voltage with a reference voltage $V_{REF}$ using comparator 121. The comparator 121 is a hysteretic comparator, so that when the divided $V_{POS}$ reaches the lower limit of the hysteresis band, comparator 121 enables the clock driver 140. When the divided $V_{POS}$ reaches the upper limit of the hysteresis band, comparator 121 disables clock driver 140. Thus, when $V_{POS}$ falls below a threshold voltage the clock driver 140 outputs CLK and CLKB to cause charge pump circuit 160 to raise $V_{POS}$. When $V_{POS}$ reaches an upper threshold voltage, the clock driver 140 is disabled and the voltage $V_{POS}$ at output node 165 is allowed to decrease.

This method of maintaining $V_{POS}$ near a target voltage causes a ripple voltage as $V_{POS}$ fluctuates between the upper and lower threshold voltages. The amplitude of the output ripple is reduced by a load filter capacitor 180 that is connected between output node 165 and ground.

Charge pump systems such as charge pump system 100 can produce an output voltage having a peak-to-peak ripple on the order of 300 mV. Furthermore, the frequency of the ripple may depend on the amount of current being drawn from the output node 165. For example, if a load connected to output node 165 draws a large amount of current from node 165, the output voltage $V_{POS}$ decreases more quickly. Thus, the comparator system 120 will enable and disable clock driver 140 at a higher frequency to maintain $V_{POS}$ near the target voltage. Thus, according to one strategy for reducing noise caused by a ripple voltage with variable frequency, a noise filter would target a wide range of frequencies depending on variability of the predicted load current.

A boosted voltage with a low ripple voltage can be achieved using a charge pump circuit controlled by a voltage regulator and a clock driver. In a charge pump system having reduced ripple, the use of large filter capacitors can be avoided. Furthermore, such a charge pump system can be used to generate an output voltage having a ripple voltage frequency that is independent of the amount of current being drawn from the output node. Thus, noise resulting from the ripple voltage can be filtered at a known frequency.

Figure 2:
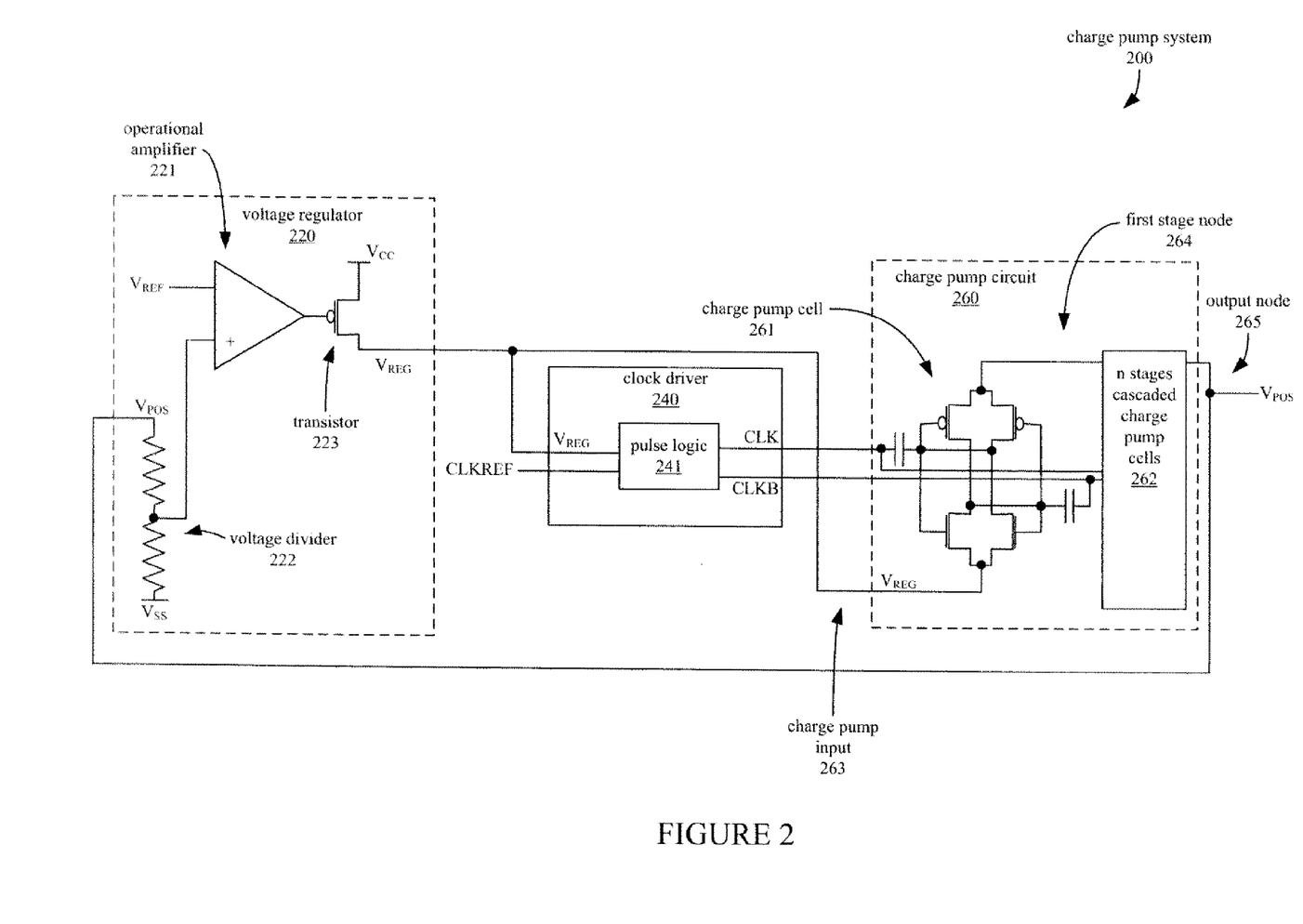
FIG. 2 illustrates one embodiment of a charge pump circuit with an output voltage controlled by a voltage regulator.

FIG. 2 illustrates a charge pump system 200 including a charge pump circuit 260 that is controlled by a voltage regulator 220 and a clock driver 240. Charge pump circuit 260 includes voltage regulator 220, clock driver 240, and charge pump circuit 260. Voltage regulator 220 further includes operational amplifier 221, voltage divider 222, and transistor 223. Clock driver 240 further includes pulse logic 241. Charge pump circuit 260 further includes charge pump cell 261, cascaded charge pump cells 262, charge pump input 263, and first stage node 264. Charge pump circuit 260 is connected to output node 265.

In one embodiment, the charge pump circuit 260 includes a number of charge pump cells 261 and 262. Each of the charge pump cells 261 and 262 receives an input voltage and boosts the input voltage to a higher output voltage. The charge pump cells 261 and 262 in the charge pump circuit 260 are cascaded in stages, so that an output voltage of one charge pump cell becomes an input voltage of the next charge pump cell. Thus each stage generates a boosted voltage from the previous stage. The charge pump cell in the final stage generates the final boosted output voltage.

For example, charge pump cell 261 receives regulated supply voltage $V_{REG}$, which is supplied to the charge pump input 263, and generates a boosted voltage. Charge pump cell 261 outputs the boosted voltage to the first stage node 264. The second stage boosts the first stage boosted voltage from node 264 and outputs a second stage boosted voltage to the third stage. The input voltage $V_{REG}$ is thus successively boosted through the charge pump cell 261 of the first stage, and through the subsequent n stages of charge pump cells 262. The output of the final stage is output to node 265 as output voltage $V_{POS}$. In alternative embodiments, the charge pump circuit 260 includes only one charge pump cell, such that the input voltage $V_{REG}$ is boosted through only one stage. In such an embodiment, the first stage node 264 may be connected directly to the output node 265.

For charge pump circuit 260, the output voltage $V_{POS}$ increases or decreases according to the regulated supply voltage $V_{REG}$ supplied to charge pump input 263. Thus, the voltage level of $V_{POS}$ can be controlled by adjusting the voltage level of $V_{REG}$. Voltage regulator 220 performs this adjustment of $V_{REG}$ based on the voltage level of $V_{POS}$.

In one embodiment, voltage regulator 220 compares the output voltage $V_{POS}$ directly with a reference voltage $V_{REF}$. For example, in some cases when a reference voltage $V_{REF}$ is available that is close to $V_{POS}$, $V_{POS}$ can be applied to the positive input of operational amplifier 221 to compare $V_{POS}$ to the reference voltage $V_{REF}$ applied to the negative input of amplifier 221.

In an alternative embodiment, voltage regulator 220 divides output voltage $V_{POS}$ using a voltage divider 222, and compares the divided voltage with a reference voltage $V_{REF}$. The divided voltage is applied to the positive input of an operational amplifier 221 while $V_{REF}$ is applied to the negative input of operational amplifier 221. When the divided voltage is below $V_{REF}$, the output of amplifier 221 decreases. The output of amplifier 221 is connected to the gate of transistor 223. Since transistor 223 is a p-channel transistor, the transistor 223 responds to the decrease in voltage at its gate by allowing more current to flow from the source of transistor 223 to the drain, which provides voltage V$_{REG}$. Because of the increase in current to the drain, voltage V$_{REG}$ increases.

When the divided voltage is higher than V$_{REF}$, the output of amplifier 221 increases in voltage, which in turn decreases the source-to-drain current of transistor 223. Since the current flowing from the source to the drain decreases, the voltage V$_{REG}$ at the drain accordingly decreases.

Thus, the voltage regulator 220 produces a regulated supply voltage V$_{REG}$ that increases when the output voltage V$_{POS}$ decreases, and decreases when V$_{POS}$ increases. In one embodiment, the control mechanism implemented in voltage regulator 220 is an analog control mechanism that allows for constant minute adjustments of V$_{REG}$ to keep V$_{POS}$ near a target voltage. Thus, ripple is reduced because even minor drift in V$_{POS}$ results in an immediate corresponding adjustment in V$_{REG}$.

In one embodiment, the voltage regulator 220 is a low drop-out (LDO) regulator. As a LDO regulator, voltage regulator 220 can maintain a voltage level V$_{REG}$ that is closer to V$_{CC}$. A LDO regulator may be used in situations where a high voltage is not available for use as supply voltage V$_{CC}$, since the LDO regulator would allow V$_{REG}$ to reach a higher range of voltages. For example, transistor 223 may be a p-channel transistor that has a low potential difference between its source and drain. Thus V$_{REG}$ can reach a higher voltage closer to V$_{CC}$, as compared to a voltage regulator having a transistor 223 with a high source-to-drain voltage.

In one embodiment, the transistor 223 may be an n-channel transistor. In this case, the voltage regulator operates in similar fashion as described above, except that the positive and negative inputs to operational amplifier 221 are reversed.

In addition to voltage regulator 220, operation of the charge pump circuit 260 is also controlled by signals from clock driver 240. Clock driver 240 supplies a clock signal CLK and an inverted clock signal CLKB to the charge pump circuit 260. The clock signals CLK and CLKB control switches, which may be implemented by transistors or diodes, in charge pump circuit 260. The operation of these switches causes the charge pump circuit to boost the voltage at its input 263. For example, each on-off cycle of the switches boosts the input voltage by a small amount. Furthermore, the amount of the boost corresponds to the amplitude of the clock signals CLK and CLKB. Thus, the level of the output voltage V$_{POS}$ can be controlled using the voltage regulator 220 and clock driver 240, which operate together to adjust the amplitude of CLK and CLKB.

Clock driver 240 includes pulse logic 241, which receives regulated supply voltage V$_{REG}$ and reference clock CLKREF as inputs. Pulse logic 241 outputs the regulated clock signal CLK and the inverted clock signal CLKB.

Figure 3A:
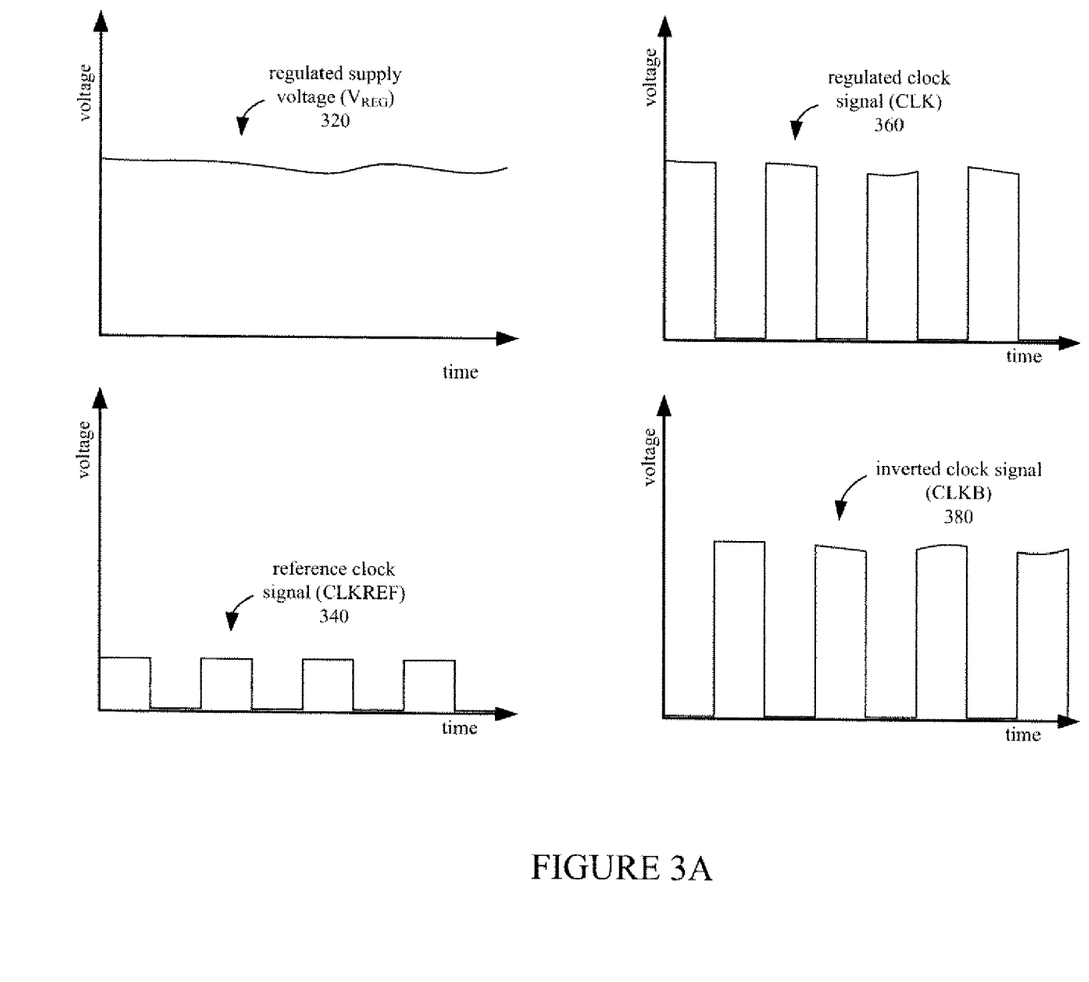
FIG. 3A illustrates input and output waveforms of a clock driver according to one embodiment.

FIG. 3A illustrates voltage levels over time of the inputs and outputs of a clock driver 240, according to one embodiment. Clock driver 240 receives as inputs the regulated supply voltage V$_{REG}$ 320, which changes only slowly over time, and the reference clock signal CLKREF. Based on V$_{REG}$ 320 and CLKREF 340, the pulse logic 241 generates a regulated clock signal CLK 360. The regulated clock signal CLK 360 is a clock signal having the same frequency and duty cycle of the reference clock signal CLKREF 340, and also has an amplitude corresponding the voltage level of the regulated supply voltage V$_{REG}$ 320. In one embodiment, the amplitude of the regulated clock signal CLK 360 is equal to V$_{REG}$ 320. In alternative embodiments, the amplitude of CLK 360 may be proportional or otherwise related to V$_{REG}$ 320.

The pulse logic 241 also generates the inverted clock signal CLKB 380, which has the same frequency as the regulated clock signal CLK 360 but is logically inverted with respect to CLK 360 such that CLKB 380 is high only when CLK 360 is low. Furthermore, the pulses of CLKB 380 are non-overlapping with respect to the pulses of CLK 360, so that CLK 360 and CLKB 380 are not both high at the same time. Non-overlapping clock signals result in more efficient operation of the charge pump circuit 260, as compared to overlapping clock signals.

As described above, V$_{REG}$ increases when V$_{POS}$ decreases and V$_{REG}$ decreases when V$_{POS}$ increases, due to the operation of voltage regulator 220. Thus, the amplitudes of CLK 360 and CLKB 380, which correspond to V$_{REG}$, also increase when V$_{POS}$ decreases and decrease when V$_{POS}$ increases. Since the amount of the voltage boost corresponding to each clock pulse increases with the amplitude of the clock pulse, the boost amount per clock pulse is increased when the output voltage V$_{POS}$ decreases and is decreased when V$_{POS}$ increases.

Thus, the charge pump circuit 260 receives as inputs the regulated supply voltage V$_{REG}$, the regulated clock signal CLK, and the inverted clock signal CLKB. The voltage levels of each of these signals, which is determined by V$_{REG}$, influences the output voltage V$_{POS}$ of charge pump circuit 260. Thus V$_{POS}$ is maintained near a target voltage by adjusting V$_{REG}$ according to feedback from V$_{POS}$.

The feedback control described above works with various types of charge pump circuits, such as, for example, static charge transfer switch (CTS) or Dickson charge pumps. Furthermore, although embodiments including a positive charge pump circuit 260 generating a positive output voltage V$_{POS}$ is illustrated herein, in alternative embodiments, charge pump circuit 260 may include a negative charge pump circuit that generates a negative output voltage.

Figure 3B:
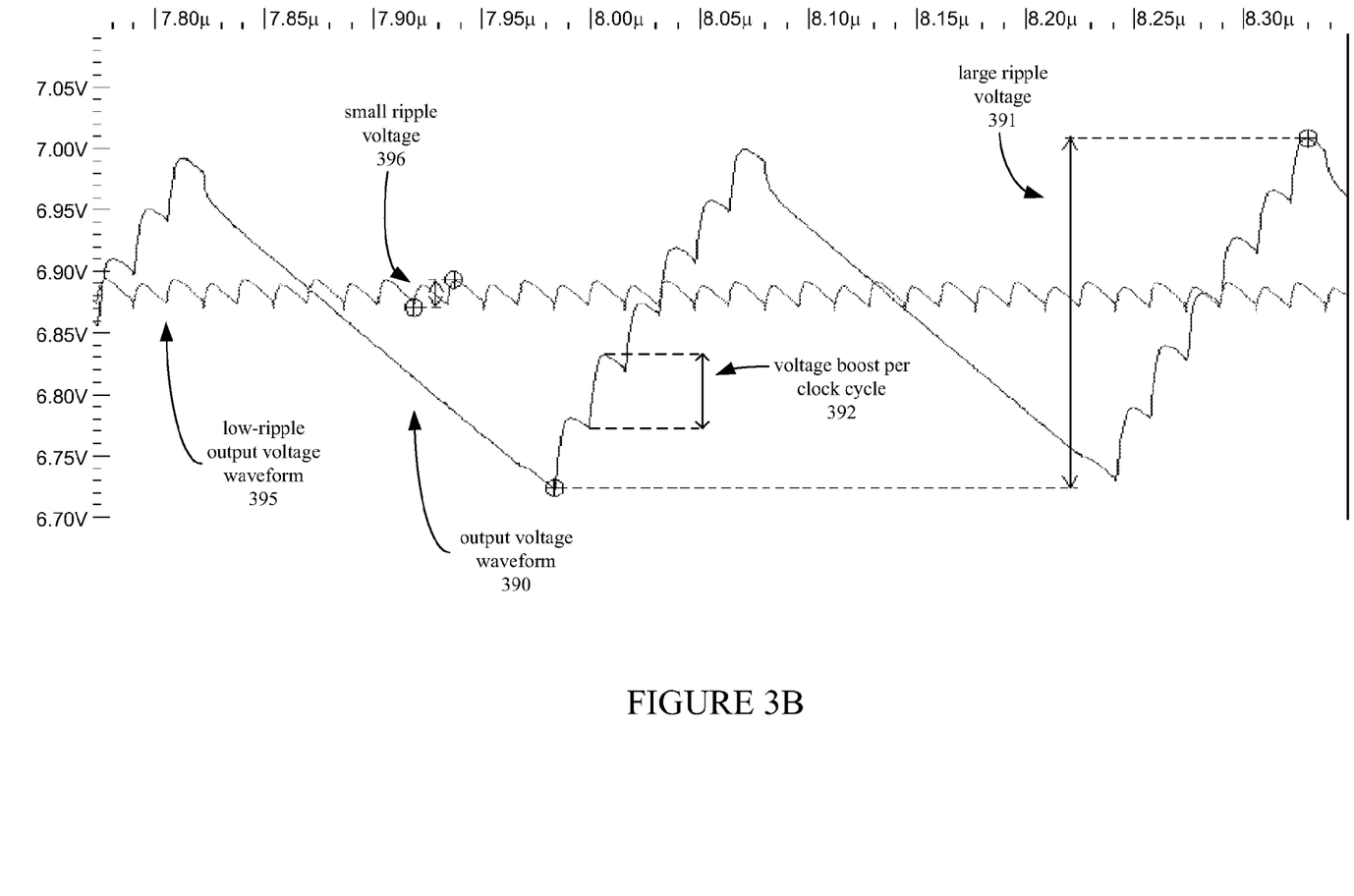
FIG. 3B is a graph depicting output voltages of a charge pump circuit controlled by a comparator system and a charge pump circuit controlled by a voltage regulator, according to one embodiment.

FIG. 3B illustrates an output voltage V$_{POS}$ of charge pump system 200 and an output voltage of charge pump system 100, according to one embodiment. In FIG. 3B, the output voltage waveform 390 depicts the changes in the output voltage at output node 165 of charge pump system 100, including the large ripple voltage 391 and the voltage boost per clock cycle 392. Low-ripple output voltage waveform 395 depicts the changes in the output voltage at output node 265 of charge pump system 200, including the small ripple voltage 396, which is approximately equal to the voltage boost per clock cycle for charge pump system 200.

Output voltage waveform 390 increases and decreases periodically over time. This increase and decrease results in a large ripple voltage 391. In one embodiment, large ripple voltage 391 may be approximately 300 millivolts.

The time periods during which voltage waveform 390 increases correspond to time periods during which the clock driver 140 is enabled. During these time periods, the voltage waveform 390 is characterized by a number of small increases in voltage caused by the clock pulses from clock driver 140. The amount of each of these small increases, which is the voltage boost per clock cycle 392, depends on the amplitude of the clock signals CLK and CLKB from clock driver 140. Thus, depending on the amplitude of the clock signals, the rate of the overall voltage increase can change. If the rate of the voltage increase is high, the frequency of the ripple voltage increases, since the time period for the voltage 390 to reach the upper threshold is shorter.

The time periods during which the voltage waveform 390 is decreasing correspond to time periods during which the clock driver 140 is disabled. During these times, the charge pump circuit 160 is not increasing the voltage at its output. Instead, the output voltage decreases as a result of any current being drawn from output node 165. Depending on the load current, the time period for the output voltage to reach the lower threshold can change. Thus, the frequency of the ripple voltage can also be affected by the load current being drawn from output node 165.

The low-ripple output voltage waveform 395 depicts the output voltage of charge pump system 200 at output node 265. Low-ripple output voltage waveform 395 is characterized by a small ripple voltage 396. In one embodiment, the small ripple voltage 396 is on the order of approximately 30 millivolts, or one-tenth of large ripple voltage 391.

Low-ripple output voltage waveform 395 depicts the ripple voltage as periodic increases and decreases in the output voltage at output node 265. The increases correspond to pulses of the CLK signal from clock driver 240. The amount of each increase corresponds to the amplitude of the CLK signal, with a higher amplitude resulting in a higher increase in voltage per clock cycle.

In charge pump system 200, the amplitude of the regulated clock signal CLK, and thus the amount of the voltage boost per clock cycle, is determined using feedback from the output voltage at node 265. Thus, the voltage boost per clock cycle is maintained at a level that just compensates for the amount of the periodic decreases in voltage.

The decreases in low-ripple output voltage waveform 395 result from load current being drawn from the output node 265. A higher load current results in a faster decrease in voltage. This, in turn, causes the voltage regulator 220 to increase the regulated supply voltage $V_{REG}$ and increase the amplitude of the regulated clock signal CLK to compensate for the decrease.

In addition, the voltage regulator 220 also adjusts the voltage $V_{REG}$ applied to the input of the charge pump circuit 260 using feedback from the output voltage at node 265. Because the adjustments to $V_{REG}$ are analog, they result in relatively small and constant adjustments in the output voltage waveform 395, and do not contribute significantly to the ripple voltage 396.

In one embodiment, the frequency of the ripple voltage 396 is independent from the load current and the voltage boost per clock cycle. Change in the load current, which result in a decrease in the output voltage at node 265, are compensated by a corresponding increase in the voltage boost per clock cycle. Thus, the amplitude of the ripple voltage 396 may increase with the load current, but the frequency of the ripple remains unchanged.

Noise injection resulting from the operation of a charge pump system 200 can therefore be reduced by filtering the noise in a narrow band of frequencies. In particular, the known frequency of the small ripple voltage 396 may be more narrowly targeted for filtering because of its stability.

The low amplitude of the small ripple voltage 396 also allows the elimination of large filter capacitors from the charge pump system 200. Thus, a charge pump system 200 that is implemented on an integrated circuit substrate will occupy a smaller overall substrate area than a charge pump system that uses large filter capacitors.

For example, for a charge pump system using large filter capacitors, the area occupied by the filter capacitor may be 20-40% of the total area occupied by the charge pump system. Thus, eliminating the filter capacitor can reduce the area used by the charge pump system by 20-40%.

The area occupied by a charge pump system also depends on the ratio of the output voltage to the input voltage of the charge pump system, as well as the output load current capability. Specifically, the area used by the charge pump system increases with the output to input voltage ratio or the output load current capability. In one embodiment, for a positive charge pump system having an output to input ratio of approximately 4.6 and an output load current capability of 40 μA, the area occupied by the charge pump system on an integrated circuit substrate can be approximately 38,000 square microns, when the charge pump system avoids using or uses much fewer filter capacitors. In one embodiment, for a negative charge pump system having an output to input ratio of approximately 2.8 and an output load current capability of 40 μA, the area occupied by the charge pump system on an integrated circuit substrate can be approximately 50,000 square microns, when the charge pump system avoids using or uses much fewer filter capacitors.

Figure 4:
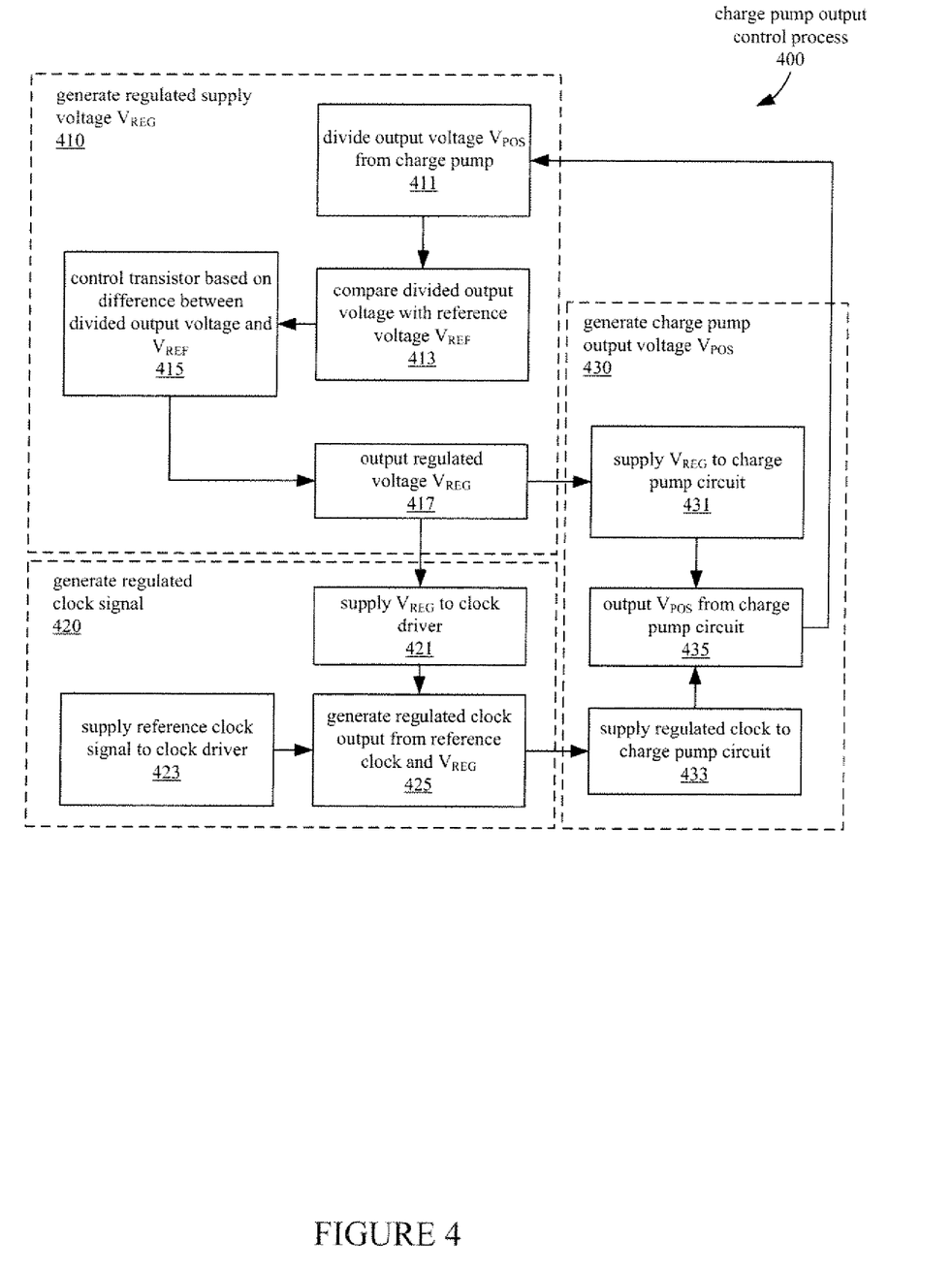
FIG. 4 is a flow chart illustrating a process for controlling an output voltage of a charge pump circuit, according to one embodiment.

FIG. 4 is a flow chart illustrating a method for controlling a charge pump output voltage, according to one embodiment. Charge pump output control process 400 includes stage 410, where regulated supply voltage $V_{REG}$ is generated, stage 420, where a regulated clock signal CLK is generated, and stage 430, where the charge pump output voltage $V_{POS}$ is generated.

At stage 410 of process 400, a regulated supply voltage $V_{REG}$ is generated based on feedback from the output voltage $V_{POS}$ of a charge pump circuit.

At block 411 of stage 410, the output voltage $V_{POS}$ is divided to generate a divided voltage. For example, a voltage divider 222 connected with output node 265 divides the output voltage $V_{POS}$ to a lower divided voltage.

At block 413, the divided output voltage is compared with a reference voltage $V_{REF}$. For example, in charge pump system 200, the divided output voltage is applied to the positive input of operational amplifier 221 and the reference voltage $V_{REF}$ is applied to the negative input of operational amplifier 221. The operational amplifier 221 outputs a voltage based on the difference between the divided output and the reference voltage $V_{REF}$.

At block 415, a transistor is controlled based on this difference between the divided output voltage and the reference voltage $V_{REF}$. In charge pump system 200, the output of operational amplifier 221 is connected with the gate of transistor 223. The source to drain current of transistor 223 is thus controlled according to the difference between the divided output voltage and $V_{REF}$, which are applied to the inputs of operational amplifier 221.

At block 417, the regulated supply voltage $V_{REG}$ is output from the voltage regulator. In charge pump system 200, the transistor 223 supplies the regulated supply voltage $V_{REG}$ from its drain terminal. The regulated supply voltage $V_{REG}$ increases or decreases based on the gate voltage of transistor 223.

At stage 420, a regulated clock signal CLK is produced, where the regulated clock signal has an amplitude based on the regulated supply voltage $V_{REG}$ and a frequency and duty cycle of a reference clock signal CLKREF.

At block 421 of stage 420, the regulated supply voltage $V_{REG}$ is supplied to a clock driver. For example, in charge pump system 200, the drain of transistor 223, which supplies the regulated supply voltage $V_{REG}$, is connected with an input of the clock driver 240.

The reference clock signal CLKREF is supplied to the clock driver in accord with block 423.

At block 425, the regulated clock output is generated based on the voltage level of regulated supply voltage $V_{REG}$ and the frequency and duty cycle of reference clock CLKREF. For example, clock driver 240 generates a regulated clock signal CLK having an amplitude that is equal to the voltage level of $V_{REG}$ and having the same frequency and duty cycle as CLKREF. In an alternative embodiment, the regulated supply voltage CLK may have an amplitude that is proportional to the voltage level of $V_{REG}$, or is offset from $V_{REG}$ by a DC voltage.

In addition to the regulated clock signal CLK, the clock driver 240 also generates an inverted clock signal CLKB, which is asserted only when CLK is deasserted. The pulses of CLKB are non-overlapping with the pulses of CLK, such that CLK and CLKB are not asserted simultaneously.

At stage 430, the output voltage $V_{POS}$ is generated at the output of the charge pump. The output voltage of the charge pump is controlled by the regulated supply voltage $V_{REG}$ and the regulated clock signal CLK generated at stages 410 and 420, respectively.

At block 431, the regulated supply voltage $V_{REG}$ is supplied to the charge pump circuit. For example, in charge pump system 200, the voltage regulator 220 is connected with the charge pump circuit 260 so that the voltage regulator 220 supplies the regulated supply voltage $V_{REG}$ to the charge pump circuit 260. In particular, the drain of transistor 223, from which $V_{REG}$ is supplied, is connected with charge pump input 263 of the charge pump circuit 260.

At block 433, the regulated clock signal is supplied to the charge pump circuit. For example, in charge pump system 200, the clock driver 240 is connected with charge pump circuit 260 so that the clock driver 240 supplies the charge pump circuit 240 with the regulated clock signal CLK.

At block 435, the voltage $V_{POS}$ is generated and output by the charge pump circuit. In charge pump system 200, for example, the charge pump circuit 260 includes charge pump cell 261, which is supplied the regulated supply voltage $V_{REG}$ as an input. Charge pump cell 261 further includes internal switches, which may be implemented as transistors. Alternatively, in certain types of charge pumps, such as Dickson charge pumps, the switching function may be implemented using diodes. The internal switches of the charge pump are switched by the regulated clock signal CLK and inverted clock signal CLKB. The switching controlled by these clock signals increases the voltage at the first stage node 264 of the charge pump cell 261. The output of the charge pump cell 261 can be used as an input of subsequent cascaded charge pump cells 262 to further boost the voltage $V_{POS}$ at output node 265.

The output voltage $V_{POS}$ is supplied to the voltage regulator through a feedback loop to control the regulated supply voltage $V_{REG}$, according to the operations in stage 410, as previously discussed.

Thus, using voltage regulator 220, clock driver 240, and charge pump circuit 260, the charge pump output control process 400 thus produces an output voltage $V_{POS}$ that is characterized by low ripple, where the frequency of the ripple is independent of load current being drawn from the output node.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
   a charge pump circuit;
   a clock driver coupled with the charge pump circuit, wherein the clock driver is configured to provide a regulated clock signal having a constant frequency to the charge pump circuit; and
   a voltage regulator coupled with the charge pump circuit, the voltage regulator comprising:
      an amplifier configured to provide an output voltage of the amplifier corresponding to a difference between a reference voltage and a voltage that is proportional to the output voltage of the charge pump circuit; and
   a transistor, wherein a gate of the transistor is coupled with the output voltage of the amplifier, a source of the transistor is coupled with a voltage source, and a drain of the transistor is configured to provide the regulated supply voltage, the voltage regulator configured to maintain an output voltage of the charge pump circuit near a target voltage by applying a regulated supply voltage to a voltage input of the charge pump circuit and to a voltage input of the clock driver, wherein the voltage regulator adjusts the regulated supply voltage in response to the output voltage of the charge pump circuit, the regulated supply voltage to increase when the output voltage of the charge pump circuit decreases and the regulated supply voltage to decrease when the output voltage of the charge pump circuit increases, wherein the constant frequency of the regulated clock signal is independent from the output voltage of the charge pump circuit.

2. The apparatus of claim 1, wherein the voltage regulator is a low drop-out (LDO) regulator.

3. The apparatus of claim 1, further comprising a voltage divider coupled with a voltage output of the charge pump circuit, wherein the voltage divider is configured to produce a divided output voltage from the output voltage of the charge pump circuit, and wherein the voltage regulator adjusts the regulated supply voltage in response to the output voltage of the charge pump circuit by comparing a reference voltage with the divided output voltage.

4. The apparatus of claim 1, wherein the clock driver is configured to adjust an amplitude of the regulated clock signal based on the regulated supply voltage.

5. The apparatus of claim 1, wherein the clock driver is configured to receive a reference clock signal that determines a frequency and a duty cycle of the regulated clock signal.

6. The apparatus of claim 1, wherein the clock driver comprises pulse logic configured to produce the regulated clock signal and an inverted clock signal, wherein pulses of the inverted clock signal are non-overlapping with respect to pulses of the regulated clock signal.

7. The apparatus of claim 1, wherein the charge pump circuit includes a plurality of charge pump cells, wherein one of the plurality of charge pump cells boosts an output voltage of another of the plurality of charge pump cells, and wherein the clock driver provides the regulated clock signal to each of the plurality of charge pump cells.

8. The apparatus of claim 1, wherein the output voltage of the charge pump circuit is a positive voltage, an output to input voltage ratio is greater than approximately 4:1, and wherein a total area occupied by the charge pump circuit, the voltage regulator, and the clock driver is less than about 40,000 square microns.

9. The apparatus of claim 1, wherein the output voltage of the charge pump circuit is a negative voltage, an output to input voltage ratio is greater than approximately 2.5:1, and wherein a total area occupied by the charge pump circuit, the voltage regulator, and the clock driver is less than about 60,000 square microns.

10. A method, comprising:
   adjusting a regulated supply voltage based on an output voltage of a charge pump circuit;
   generating a regulated clock signal having a constant frequency; and
   maintaining the output voltage of the charge pump circuit near a target voltage by applying the regulated supply voltage to a voltage input of the charge pump circuit while applying the regulated clock signal to a clock input of the charge pump circuit, wherein the adjusting the regulated supply voltage comprises:
   comparing the output voltage of the charge pump circuit with a reference voltage; and
   controlling a transistor based on a difference between the output voltage of the charge pump circuit and the reference voltage, wherein the regulated supply voltage increases when the output voltage of the charge pump circuit decreases and the regulated supply voltage decreases when the output voltage of the charge pump circuit increases, wherein the constant frequency of the regulated clock signal is independent from the output voltage of the charge pump circuit.

11. The method of claim 10, wherein comparing the output voltage of the charge pump circuit with the reference voltage comprises dividing the output voltage of the charge pump circuit.

12. The method of claim 10, further comprising adjusting an amplitude of the regulated clock signal in response to changes in the regulated supply voltage.

13. The method of claim 10, further comprising receiving a reference clock signal to determine a frequency and a duty cycle of the regulated clock signal.

14. The method of claim 10, further comprising:
   generating an inverted clock signal, wherein pulses of the inverted clock signal are non-overlapping with respect to pulses of the regulated clock signal; and
   applying the inverted clock signal to the charge pump circuit.

15. The method of claim 10, wherein the output voltage of the charge pump circuit has a ripple voltage less than about 50 millivolts.

16. The method of claim 10, wherein a ripple voltage frequency of the output voltage is independent of a load current supplied by the charge pump circuit.

* * * * *